INVENTOR.
ROGER D. ERICKSON

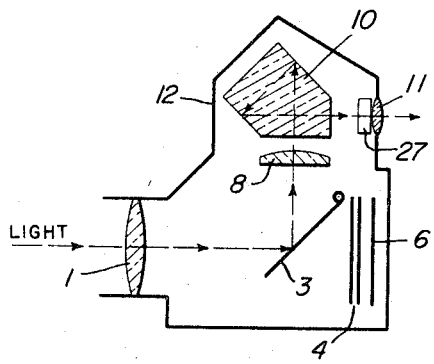
FIG. 2
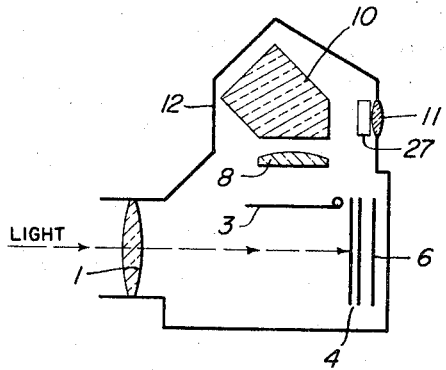
FIG. 3
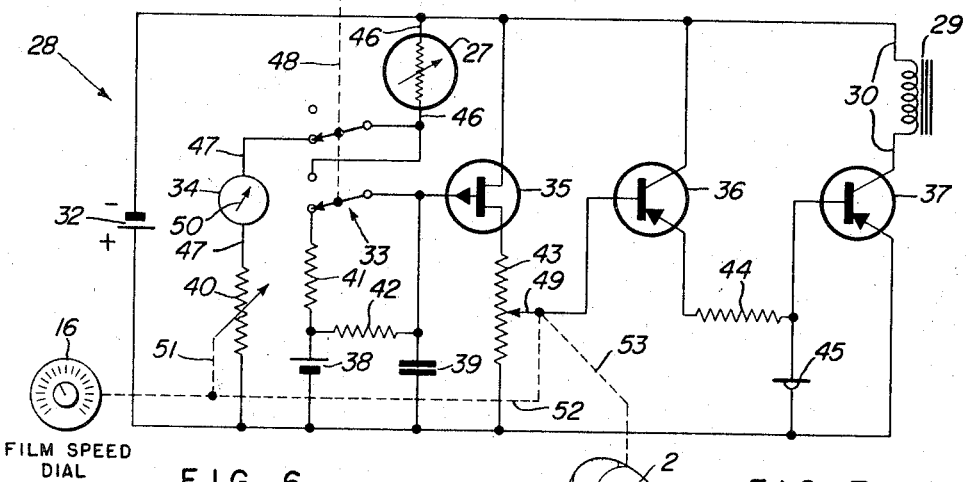
FIG. 4
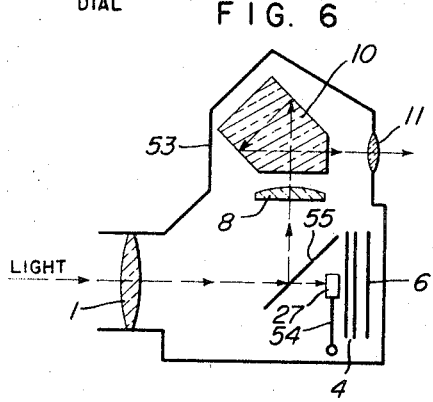
FIG. 6
FIG. 7
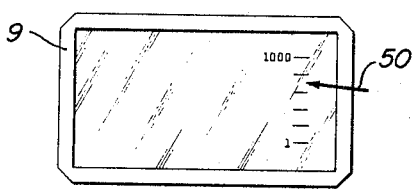
FIG. 5
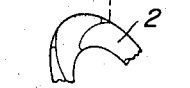
INVENTOR.
ROGER D. ERICKSON
BY
ATTORNEY.

3,442,190
PHOTOGRAPHIC APPARATUS
Roger D. Erickson, Littleton, Colo., assignor to Honeywell Inc., Minneapolis, Minn., a corporation of Delaware
Filed July 21, 1965, Ser. No. 573,590
Int. Cl. G01j 1/52
U.S. Cl. 95—10                                                                 1 Claim

ABSTRACT OF THE DISCLOSURE

Automatic exposure control in a single lens reflex camera wherein a photocell having a memory initially views through the taking lens the light from the scene to be photographed. When the camera shutter is manually opened, the viewing mirror moves up and blanks the photocell which is then electrically switched into a timing circuit which closes the shutter at the end of a time period determined by the resistance memory of the photocell and hence by the intensity of the light which the photocell received before being blanked.

---

The present invention relates generally to photographic cameras embodying automatic exposure control. Specifically, the invention relates to the automatic exposure control apparatus portions of such cameras by which the exposure of the photosensitive medium or film in the camera is controlled automatically in accordance with the intensity of the light which reaches the light sensitive devide or photocell of the apparatus from the subject to be photographed. More specifically, the invention relates to that form of apparatus of the foregoing type wherein the light which reaches the photocell does so through the lens of the camera, wherein the photocell is blanked and its illumination is thus interrupted while the film is being exposed, and wherein this exposure is controlled in accordance with the intensity of the light which reached the photocell just prior to such interruption.

A general object of the present invention is to provide improved automatic exposure control apparatus of the type last referred to above. A specific object of the invention is to provide such improved apparatus which is characterized by its simplicity, its versatility, and its reliability with respect to the previously known apparatus of this general type.

A more specific object of the present invention is to provide improved apparatus of the type last referred to wherein a novel arrangement is employed for causing the apparatus to remember the intensity of the light which fell on the photocell just prior to the beginning of the exposure and the blanking of the photocell, thereby to cause this exposure to be controlled in accordance with this remembered light intensity.

In a camera provided with automatic exposure control, it is desirable to have the required exposure determined by a photocell which is responsive solely to the intensity of the light which comes through the camera lens. This procedure enables the apparatus to provide the correct controlled exposures automatically notwithstanding changes in lenses, focal lengths, and apertures.

From the theoretical standpoint, the simplest way to effect such automatic exposure control based on through-the-lens light metering would be simply to place a photocell or other light sensitive device in a position in the camera wherein the photocell would be responsive to the incoming light during the exposure of the film, and would operate means to close the camera shutter when sufficient light had reached the film to provide the proper exposure and a suitable photograph. However, such placement of the photocell introduces practical problems, since it is undesirable to have the photocell in any way impede or affect the light falling on the film during the exposure thereof, and since the placement of the photocell in a position where it can receive the light which is falling on the film tends to introduce such impeding, and to cause the photocell to undesirably obstruct the light path between the lens and the film.

Several procedures have been suggested in the past for overcoming this inherent problem associated with through-the-lens metering. However, none of these procedures has produced really satisfactory resutls in practice. According to one of these suggestions, a fraction of the light coming in through the lens is diverted from reaching the film, and is directed to the photocell. It has been suggested that this be done by placing a partial mirror or beam splitter between the lens and the film. However, such an element in effect undesirably lowers the lens transmission, and additionally introduces very difficult problems relating to double images, ghost images, fragility, maintenance, etc. Such an arrangement also has the disadvantage of permitting the photocell to see only a small portion of the total light passing through the lens.

Another procedure which has been suggested is to place the photocell so that it receives light which falls just beyond the edges of the film, thereby preventing the photocell from obstructing the light path from the lens to the film. This procedure suffers from the disadvantage that the light then measured by the photocell is off-axis light, which is not a part of the view being photographed.

Since, as noted above, there are practical difficulties involved in the measurement of light intensity through the camera lens during the exposure of the film, it has been suggested that the light intensity instead be measured immediately before the shutter is opened and the exposure is begun. This permits the photocell to be advantageously positioned, before the exposure is begun, to receive substantially the full light from the lens which will subsequently fall on the film, and further permits the photocell or associated optical element to be advantageously removed from the light path to the film during the exposure thereof so as to prevent any impeding of the light passing to the film.

It is apparent that the foregoing procedure requires that some form of memory be provided to store a value representative of the light intensity seen by the photocell just before the exposure of the film was begun and the photocell was blanked. Novel automatic exposure control apparatus embodying circuits and devices providing such a memory in combination with a photocell giving through-the-lens light metering is disclosed and claimed in the copending application of John A. Baring, Ser. No. 473,589, filed on even date herewith, and now abandoned. In each of the arrangements of said application, the photocell output prior to blanking is applied to a storage or memory circuit which stores the light intensity information for later use in controlling the duration of the film exposure.

While apparatus of the last mentioned type, employing photocells coupled to memory circuits and devices, provides satisfactory through-the-lens automatic exposure control without in any way impeding the light passing to the film during its exposure, there has still existed a need for even simpler, more compact apparatus exhibiting a higher degree of linearity and consistency over a wider illumination intensity range and with minimum bias voltage requirements. Accordingly, it is a prime object of the present invention to provide such improved through-the-lens metering type automatic exposure control apparatus which does not require any separate memory circuits or devices, and which provides higher accuracy control over a wide light intensity range without requiring more than a relatively low bias voltage.

It is a further object of the invention to provide such improved apparatus wherein provisions are made for indicating, prior to exposure, the shutter speed which the apparatus will subsequently employ in its automatic control of the ensuing exposure.

The novel apparatus according to the present invention fulfills the foregoing and other desirable objects by utilizing as its light sensitive device a photocell which is characterized by its relatively long output decay time or memory. Accordingly, this apparatus neither requires nor includes any memory circuits or other memory devices. Said photocell is coupled within the associated camera with control means which, prior to the exposure of the camera film (i.e., the taking of a photograph), causes the cell to be illuminated by the light coming through the lens of the camera from the subject to be photographed. Accordingly, the value of the resistance or output of the photocell is then a measure of the intensity of this light.

As the camera shutter release button is subsequently depressed, the control means causes the illumination of the photocell to be interrupted as the light from the subject is directed to the film and the exposure thereof to this light is begun. The control means then permits this exposure to continue for a time which is determined by the value of the photocell resistance, which value, due to the memory characteristic of the photocell, is a measure of the intensity of the light which reached the photocell just prior to its being blanked. As a result, the exposure of the film is controlled in accordance with the intensity of the light coming from the subject to be photographed, as is desired.

In the embodiments of the invention illustrated herein by way of example, the automatic control by the photocell of the exposure of the camera film is effected through the medium of varying the camera shutter speed. That is, the photocell automatically controls the length of the time period during which the shutter is caused to remain open and allow the light from the subject to reach the film. Thus, in the arrangements illustrated herein, actuation of the shutter release button opens the shutter and starts the exposure, whereafter the photocell causes the control means to close the shutter after a time which is a function of the value of the photocell resistance, and which is thus a function of the intensity of the light which reached the photocell just prior to the start of the exposure.

A better understanding of the present invention may be had from the following detailed description of apparatus embodying the invention, which description is to be read in connection with the accompanying drawings wherein:

FIG. 2 is a diagrammatic view of the FIG. 1 camera to illustrate the light path when the photocell of the control apparatus is receiving light;

FIG. 3 is a view similar to that of FIG. 2 but showing the light path when an exposure is about to be made;

FIG. 4 is a diagram of an electrical circuit which can be used in the FIG. 1 arrangement;

FIG. 5 is a detail view of the shutter speed indicating means of the FIG. 1 arrangement; and FIGS. 6 and 7 are views similar to those of FIGS. 2 and 3 but for a different type of camera having the photocell in a different location.

*The arrangement of FIG. 1*

Figure 1:
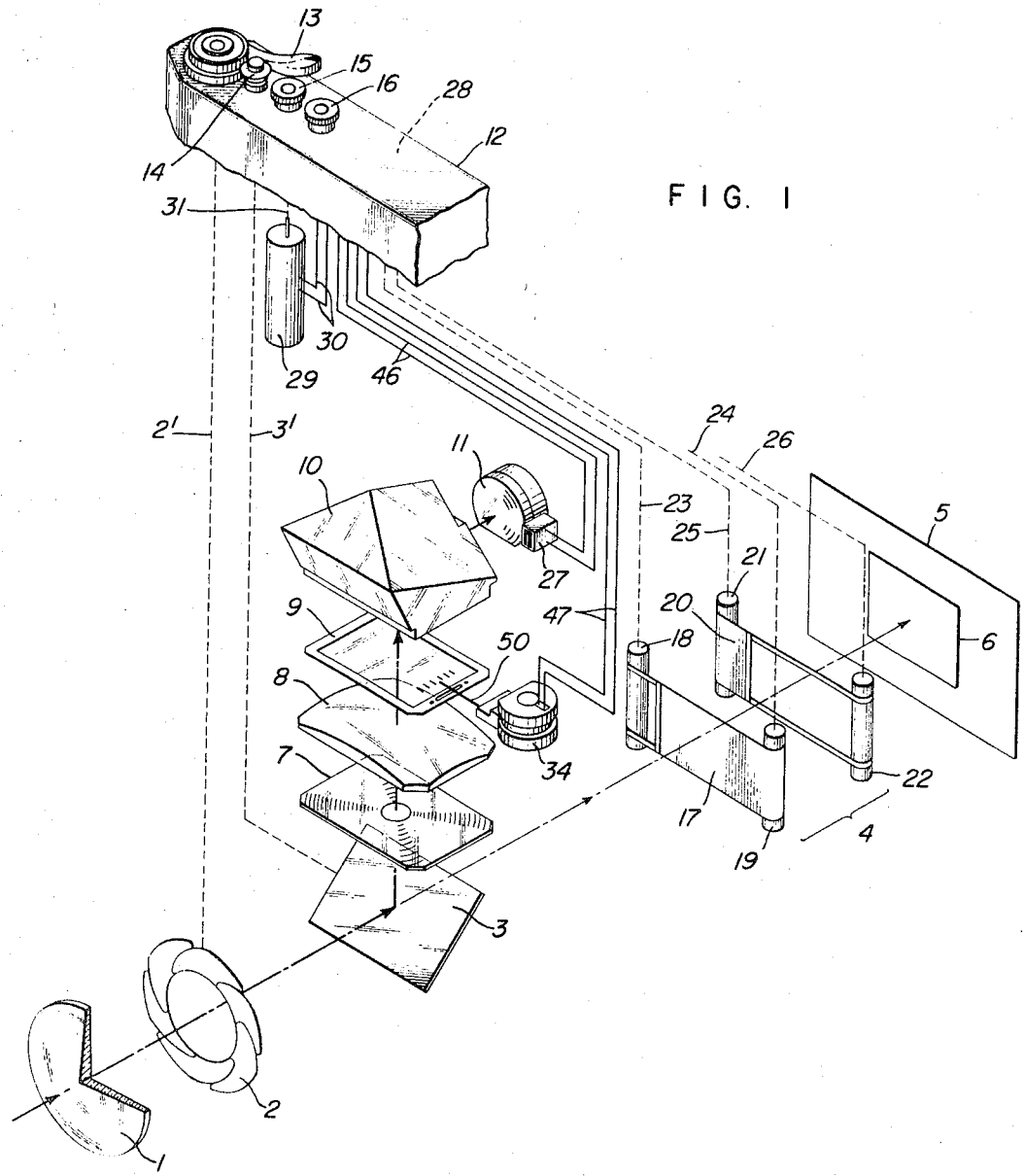
FIG. 1 is a semi-pictorial view of portions of a camera embodying automatic exposure control apparatus according to the present invention.

FIG. 1 shows the significant portions of a camera which is equipped with through-the-lens automatic exposure control apparatus according to the present invention. By way of illustration, the camera of FIG. 1 has been shown as being a so-called single lens reflex camera of the moving mirror type, but it is to be understood that the invention apparatus is equally applicable to other types of single lens reflex cameras, as well as to twin lens reflex and non-reflex cameras.

The camera of FIG. 1 includes the usual lens, which has been shown in simplified form at 1, an iris diaphragm 2, a mirror 3, a focal plane shutter 4, and a receiver 5 for a photosensitive medium or film 6. With the exception of the mirror 3, the foregoing elements consitute the usual basic photograph-taking elements of the camera.

The mirror 3 is part of the usual viewing or sighting means in a single lens reflex camera, which means in FIG. 1 also includes a Fresnel lens 7, a ground glass 8, a ground glass mask 9, a penta prism 10, and an eye piece 11. These elements cooperate in the usual manner to produce on the ground glass 8 an image of the subject which is within the field of view of the camera. When this image, as viewed through the eye piece 11, has been focussed on the ground glass 8 by the manipulation of the lens 1, the image which will subsequently be recorded on the film 6 will also be in focus thereon.

The foregoing elements are all housed and supported within the usual camera body, a portion of which is shown at 12. This body also carries the usual camera controls which include a film winding and shutter cocking lever 13, a shutter release button 14, a shuttter speed dial 15, and a film speed dial 16.

The shutter 4 is of the usual type having a first curtain 17 extending between rollers 18 and 19, and having a second curtain 20 extending between rollers 21 and 22. As shown in FIG. 1, the curtain 17 is closed and the curtain 20 is open. Thus, the shutter 4 is shown in FIG. 1 as being cocked and closed. The mechanism which operates the shutter 4 is enclosed within the camera body, and is not shown herein in order to avoid making the drawing unnecessarily complex. Suffice it to say that this mechanism is of the known type, and controls the movement of the shutter curtains 17 and 20, and hence the operation of the shutter 4, by suitably actuating the rollers 18, 19, 21, and 22 through respective mechanical linkages 23, 24, 25 and 26.

The positions in which the various camera elements thus far described are shown in FIG. 1 are the positions occupied by these elements when a camera of the type shown is being used in the usual way to view and focus upon a scene just prior to the taking of a photograph thereof. Specifically, in this so-called viewing condition of the camera shown in FIG. 1, the mirror 3 is in the so-called "down" position. This position of the mirror 3 with respect to the other camera elements is also shown in FIG. 2. As is shown by the heavy dash-dot line in FIG. 1 and the dashed line in FIG. 2, the path for light coming in through the lens 1 for this condition of the camera extends through the lens 1 and the diaphragm 2 to the mirror 3. From there light is reflected up through the viewing elements 7, 8, 9, 10, and 11 to the eye of the operator to permit the aforementioned conventional viewing and focussing operation to be performed.

In accordance with the present invention, the FIG. 1 apparatus also includes a memory type photocell 27 which, as shown, is positioned immediately adjacent the eye piece 11 so as to receive the light which comes through the lens 1 when the camera elements are in the viewing position shown in FIGS. 1 and 2. By mounting the photocell 27 in this location, the light which falls upon it comes solely from within the field of view of the camera without significant attenuation, as is desired. At the same time, this location desirably prevents the photocell 27 from in any way impeding the light which falls upon the film 6 during the exposure thereof.

Further in accordance with the invention, the photocell 27 is electrically connected to means to cause the photocell 27 to control the exposure of the film 6. This means includes a timing and triggering circuit 28 which is desirably housed within the camera body 12 and which may well take the form shown in FIG. 4. This means also includes a solenoid 29. The latter is electrically connected to the circuit 28 within the camera body by means of conductors 30, and is mechanically coupled to the shutter mechanism within the camera body by a linkage 31.

*The circuit of FIG. 4*

The circuit 28 includes, in addition to the photocell 27 and the solenoid 29, a source of power, shown as a battery 32, a double-pole, double-throw switch 33, a meter 34, transistors 35, 36, and 37, a bias battery 38, a timing capacitor 39, resistors 40, 41, 42, 43, and 44, and a tunnel diode 45. The photocell 27 is connected to the circuit 28 by means of conductors 46, while the meter 34 is connected into the circuit 28 by means of conductors 47.

In the circuit 28, the switch 33 is shown as being controlled by the camera shutter mechanism through a linkage 48. The switch 33 is caused to be in the position shown in FIG. 4 when the apparatus is in the viewing condition shown in FIGS. 1 and 2. In this condition, the photocell 27 is arranged to be exposed to light coming in through the lens 1. In the illustrated position, the switch 33 connects the photocell 27 in series with the meter 34 and the resistor 40 across the battery 32 for a purpose to be described hereinafter. In this same position, the switch 33 connects the capacitor 39 in series with paralleled resistors 41 and 42 across the bias battery 38 to place a slight positive charge on the capacitor 39.

The input of the transistor 35 is effectively connected across the capacitor 39. As shown, the transistor 35 is a P-channel field effect transistor having its gate electrode connected to the upper terminal of the capacitor 39, and having its source electrode connected to the lower capacitor terminal and to the positive terminal of the battery 32 through the resistor 43. The drain electrode of the transistor 35 is connected to the negative terminal of the battery 32.

The output of the transistor 35 appears across the resistor 43 and is applied to the input of the transistor 36 by the connection of the base of the latter to a sliding contact 49 which is adjustable along the resistor 43 for a purpose to be described hereinafter. The collector of the transistor 36 is connected to the negative terminal of the battery 32, while the emitter of that transistor is connected through the resistor 44 to the base of the transistor 37. This base is also conneced through the tunnel diode 45 to the positive terminal of the battery 32, to which is also connected the emitter of the transistor 37. The collector of the latter is connected through the winding of the solenoid 29 to the negative terminal of the battery 32.

When the apparatus is in the condition shown in FIGS. 1, 2, and 4, with the switch 33 in the position shown in FIG. 4, the small positive bias on the capacitor 39 keeps the transistor 35 turned off. This in turn causes the conduction of the transistor 36 to be insufficient to turn on the transistor 37, whereby the solenoid 29 is maintained deenergized for the viewing condition of the apparatus.

*The meter 34*

The purpose of the aforementioned meter 34 will now be explained. As was noted previously, the meter 34 is connected in series with the photocell 27 and the resistor 40 across the battery 32 when the apparatus is in the viewing condition, under which condition the photocell 27 is seeing the light coming in through the lens 1 as shown in FIGS. 1 and 2. Accordingly, at this time the pointer 50 of the meter 34 is deflected by an amount which is dependent upon the intensity of the light falling on the photocell 27. Since it is this light intensity which is the basis for the automatic control of the exposure which will follow the viewing procedure, the deflection of the pointer 50 is actually representative of the shutter speed (the time period that the shutter will be caused to remain open) which the apparatus will subsequently automatically employ in its automatic control of the ensuing exposure.

As shown in FIG. 1, the meter 34 is desirably so positioned within the apparatus that its pointer 50 can be seen through the eye piece 11. When looking through the latter, the pointer 50 appears superimposed in the viewing area somewhat as shown in FIG. 5. By arranging the resistor 40 to be adjusted through a linkage 51 by the film speed dial 16 of the camera, which dial is manually set in the usual maner in accordance with the speed of the particular film being used, a scale calibrated in actual shutter speeds can be supplied cooperating with the pointer 50 as shown in FIG. 5. If desired, the meter 34 can, of course, be located elsewhere in the camera and its pointer and scale viewed through a suitable window.

The anticipated shutter speed indications provided by the meter 34 are of practical importance of two reasons. First, they show whether or not the measured, correct shutter speed will be within the range of automatic shutter speeds available. It is possible that an exposure of shorter or longer duration than those which the apparatus is capable of providing automatically would be required for the existing film speed and lens aperture. Secondly, these indications show whether the shutter speed which will automatically occur when the release button 14 is subsequently depressed will be sufficiently fast to avoid a blurred photograph under the prevailing conditions. If the indicated shutter speed is not satisfactory, an adjustment of the diapragm 2 in the usual manner may well change this shutter speed to an acceptable value.

It should be apparent from the foregoing that, just before the release button 14 is depressed to initiate an exposure, the resistance of the photocell 27 is caused to have a value dependent upon the intensity of the light coming through the lens 1 from the subject to be photographed. Actually, this resistance value is substantially inversely proportional to the intensity of the light reaching the photocell 27 over the range of resistance values utilized. This resistance value causes the meter 34 to provide an indication of the shutter speed which this resistance value will cause to occur automatically upon the subsequent depression of the release button 14.

*Operation of the apparatus during exposure*

When the release button 14 is subsequently depressed momentarily to initiate the exposure of the film 6 and the taking of the photograph, the shutter mechanism first moves the mirror 3, through a linkage 3', into its so-called "up" or photographing position as shown in FIG. 3. This now leaves an unobstructed light path from the lens 1 to the shutter 4 as shown by the dashed line in FIG. 3, but also totally interrupts or eliminates the light passing through the elements 7 through 10 and reaching the photocell 27. Thus, the latter is now blanked. However, due to the aforementioned memory characteristic of the photocell 27, its resistance remains for the time being substantially at the same value which it had when the photocell was last illuminated.

As soon as the mirror 3 reaches the position shown in FIG. 3, the shutter mechanism in the usual manner actuates the rollers 18 and 19 by means of the linkages 23 and 24 to release the first curtain 17, whereby it passes from the roller 18 to the roller 19 and opens the shutter 4. Light is now permitted to fall on the film 6, following the path of the light dash-dot line of FIG. 1, whereby the exposure is begun, At the same time, the linkage 48 moves the switch 33 out of the viewing position shown in FIG. 4 and into its upper or timing position. This effectively removes the meter 34 and the bias resistor 41 from the circuit 28, and places the capacitor 39 in series with the photocell 27 across the battery 32.

As a result of the foregoing, the capacitor 39 starts to charge in the opposite direction through the resistance of the photocell 27. Accordingly, a negative voltage builds up across the capacitor 39 at a rate which is inversely proportional to the photocell resistance and which is substantially proportional to the intensity of the light which the photocell 27 last saw before it was blanked. Therefore, the time required for the capacitor 39 to charge to a given voltage level, hereinafter referred to as the trigger level, following the instant of the opening of the shutter 4, is substantially inversely proportional to the intensity of the light which last reached the photocell 27 before it was blanked.

The transistor 35, which is connected across the capacitor 39 and is responsive to the voltage thereacross, is essentially a "source follower" or impedance matching device. Since the resistance of the photocell 27 can become quite high or low light intensities, it is desirable that the input impedance of the transistor 35 also be quite high. It is for this reason that a field effect transistor was chosen as the transistor 35.

As the voltage across the capacitor 39 increases with time, the conductivity of the transistor 36 is increased correspondingly until a value is reached at which the tunnel diode 45 sharply turns on the transistor 37. This occurs when the voltage on the capacitor 39 reaches the aforementioned trigger level. The turning on of the transistor 37 causes the solenoid 29 to be energized. Such energization of the solenoid 29 causes it to release the second curtain 20 by way of the linkage 31, whereby this curtain then passes from the roller 21 to the roller 22 under the control of the linkages 25 and 26, thereby closing the shutter 4 and terminating the exposure of the film 6.

As the foregoing explanation makes clear, the time which it takes the capacitor voltage to reach the trigger level following the instant of opening of the shutter 4, and hence the time during which the shutter 4 is open and the film 6 is being exposed, is caused to be substantially inversely proportional to the intensity of the light which last reached the photocell 27, as is desired. Stated differently, the shutter speed is automatically caused to be substantially inversely proportional to the intensity of the light coming from the scene to be photographed through the camera lens just prior to the opening of the shutter 4.

In order to make the above automatically determined shutter speed the correct speed to provide the correct exposure for the particular type of film being used, means must be provided for making this shutter speed, for the particular light intensity, dependent upon the speed of the film being used. The adjustable contact 49 on the resistor 43 provides such a means. The position of the contact 49 along the resistor 43 determines the value to which the voltage across the capacitor 39 must rise in order to trigger the transitor 37 and close the shutter 4. Thus, this contact position determines the capacitor voltage trigger value and hence the shutter speed for the existing light intensity. The contact 49 is advantageously coupled to the film speed dial 16 by a linkage 52 to permit the position of the contact 49 to be manually set in accordance with the speed of the particular film being used.

While the foregoing provides one means by which the automatically determined shutter speeds can be compensated for film speed, it is noted that such compensation can, if desired, be effected in various other ways. For example, the value of the capacitor 39 could be adjusted in accordance with the film speed. Another approach would be to adjustably attenuate the voltage output of the capacitor 39 applied to the transistor 35 in accordance with the film speed.

In the foregoing explanation, it has been assumed that the opening or aperture of the diaphragm 2 does not change in size between the viewing and exposing operations of the apparatus. In other words, it has been assumed that the setting of the diaphragm aperture is the same when the photocell 27 is receiving its light during the viewing operation as it is when the light is passing to the film 6 during the subsequent exposure thereof. It is generally desirable in practice, however, to cause the diaphragm 2 to be wide open during the viewing and focusing operations, in order to facilitate such operations, but to stop down the diaphragm automatically to a predetermined appropriately smaller opening, as by means of a linkage 2', just before the exposure is begun. The result of this is, of course, that the intensity of the light which is available for exposing the film 6 is less than that of the light which reached the photocell 27 and established its resistance.

In order to compensate the automatically-determined shutter speeds for the foregoing difference in light intensities, a linkage 53 is provided which repositions the contact 49 in accordance with any change in the diaphragm aperture size which occurs between the viewing and exposing operations. Specifically, closure of the shutter 4 moves the contact 49 so as to raise the trigger voltage level and thus increase the exposure time to compensate for the reduced light intensity under what the photocell 27 saw during the viewing operation.

Upon the completion of the foregoing exposure of the film 6, it is the usual practice to ready the camera for making the next exposure. To do this, the widening and cocking level 13 is operated manually. This operation cocks the shutter 4 and drops the mirror 3 to the conditions shown in FIG. 1, and opens the diaphragm 2 if it had been automatically stopped down during the previous exposure. This operation also moves the switch 33 to the position shown in FIG. 4, thereby reactivating the meter 34, returning the capacitor 39 to its positively biased condition, and deactivating the solenoid 29. This operation of the lever 13 also winds a new frame of film 6 into the FIG. 1 position in the film receiver 5.

If desired, the closure of the shutter 4 at the completion of an exposure can be made to disconnect the battery 32 from the circuit 28, in order to conserve the battery power. If this is done, the operation of the lever 13 can be arranged to reconnect the battery 32 for use in the ensuing viewing and exposing operations.

If it is desired to be able to set the shutter speed of the FIG. 1 apparatus manually and without the use of the photocell 27, it is only necessary to provide a suitably calibrated manually adjustable shutter speed resistor to be substituted for the photocell 27 in the FIG. 4 circuit when desired. This resistor would be coupled to the shutter speed dial 15 so that the manual adjustment thereof would suitably adjust the resistance of this resistor. The manually-made setting of this resistor would then determine the time for the capacitor 39 voltage to reach the trigger level, and hence would determine the shutter speed which would be obtained. If desired, a suitable signal can be arranged to indicate through the eye piece 11 or elsewhere whether the shutter is under the automatic timing control of the photocell 27 or is under the manual timing control of the dial 15 and the adjustable shutter speed resistor. A simple switch can be used to substitute this resistor for the photocell 27 when manually-set shutter speed is desired.

When using the apparatus disclosed herein for flash photography, the conventional shutter contacts (not shown) can be used to fire the flash apparatus by leaving the shutter under the control of the circuit 28 as shown in FIG. 4, and by having the timing of the circuit 28 determined by the setting of the manually-adjustable shutter speed resistor described above. Alternatively, the shutter-closing solenoid 29 can be arranged to be controlled by shutter contacts instead of by the circuit 28. To accomplish this it is simply necessary to have the closure of such shutter contacts energize the solenoid 29 to close the shutter 4 at the appropriate time after the flash apparatus has been fired.

In selecting a suitable photocell for use as the photocell 27 of the apparatus of the present invention, it is necessary to assure that the memory or decay time characteristic of the photocell chosen will be such as to permit the proper operation of the apparatus over the required value ranges of shutter speeds, film speeds, and diaphragm openings, and over the required combinations of such values.

A type of photocell which has been found to have such a suitable characteristic is the cadmium sulfide photoconductive cell. Such photocells exhibit a relatively long decay time at relatively low light intensities and a relatively short decay time at relatively high light intensities. Thus, when the initial illumination level of this type of photocell is high, and its initial resistance is therefore low, the rate of increase in this resistance after the photocell is blanked is relatively high, and the decay time or memory of the photocell is relatively short. However, when the initial illumination level is low, and the initial resistance is therefore high, the rate of increase in this resistance after the photocell is blanked is relatively low, and the decay time or memory of the photocell is relatively long. Thus, this type of photocell remembers its illuminated resistance for a much longer time for low levels of illumination than it does for high levels of illumination. Since in the present apparatus high light intensities dictate high or fast shutter speeds or short exposure times and thus require the photocell to have only a short memory, while low light intensities dictate slow shutter speeds or long exposure times and thus require the photocell to have a longer memory, the foregoing type of photocell is highly advantageous for use in accordance with the present invention.

It should be noted, however, that different types of cadmium sulfide photocells exhibit different decay times for a given illumination level. Accordingly, it is important when choosing the type of photocell for use according to the present invention to select a type which exhibits a decay time or memory characteristic which is compatible with the desired shutter speeds and other values of the assoicated apparatus.

By way of illustration and example, and not by way of limitation, it is noted that one specific type of photocell which has been found to perform admirably in apparatus of the type disclosed herein for shutter speeds from 1/1000 second to ¼ second, for film speeds from ASA 25 to ASA 400, and for a maximum lens aperture of $f/1.4$ is the Part #231–J02 cadmium sulfide photoconductive cell manufactured by the Asahi Optical Company of Tokyo, Japan. It is to be understood, however, that other types and makes of photocells are equally suitable for use in apparatus according to the present invention.

By further way of illustration and example, and again not by way of limitation, it is noted that the various components of an operable embodiment of the FIG. 4 circuit which performed admirably in accordance with the present invention had the following values:

| | |
|---|---|
| Photocell 27 | Asahi Type 231–J02 |
| Battery 32 | 2.5 volts |
| Transistor 35 | Type SU437 |
| Transistor 36 | Type 2N1305 |
| Transistor 37 | Type 2N1305 |
| Battery 38 | 1.25 volts |
| Capacitor 39 | 0.5 mfd. |
| Resistor 41 | 1 megohm |
| Resistor 42 | 100 megohms |
| Resistor 43 | 10 Kohms |
| Resistor 44 | 1 Kohm |
| Diode 45 | Type 1N3940 |

*The arrangements of FIGS. 6 and 7*

The photocell 27 need not necessarily be located in the camera in the specific position shown in FIGS. 1 through 3 in order to secure the benefits to be derived from the teachings of the present invention. Instead, the photocell 27 may be placed elsewhere in the camera, just as long as it is arranged to receive light coming in through the lens 1 within the camera field of view and in no way causes the light falling on the film 6 to be impeded during exposure. A typical one of such other locations for the photocell 27 is shown by way of example in FIGS. 6 and 7. In the camera body 53 of these figures, the photocell 27 is mounted on a pivoted support 54 behind a fixed partial mirror or beam splitter 55. In the viewing condition of the camera, the photocell 27 is in the position shown in FIG. 6, wherein it receives light entering through the lens 1. When the camera shutter release button is first depressed, the photocell 27 is swung down and out of the way to the position shown in FIG. 7. In this position, the photocell 27 is blanked as before, and the memory characteristic of the photocell 27 is required to control the shutter timing as before. The related ttiming and shutter controlling means for the FIGS. 6 and 7 arrangement would be the same as those previously described.

It is believed to be apparent that still other locations for the photocell 27 are possible within the scope of the present invention. For example, the photocell 27 could be placed on either the front or the back of the mirror 3. Similarly, in a non-reflex camera, the photocell 27 could be pivotally mounted in front of the shutter as is done in the arrangement of FIGS. 6 and 7. Alternately, the photocell 27 could be mounted in such a camera entirely out of the path of light to the film, and a pivoted mirror could be placed so as to direct the lens light to the photocell when the camera is in the viewing condition, and then moved out of the light path to the film when the exposure was to be made. In each case, the memory characteristic of the photocell 27 would be required as for the arrangements of FIGS. 1, 2, 3, 6, and 7.

It should also be noted that, if desired, two photocells, one on each side of the eye piece 11, could be employed instead of the single photocell 27. The outputs of the two photocells would then desirably be connected in parallel. Also, the automatic exposure control apparatus according to the invention could, if desired, be used to control shutters of other types than that shown in FIG. 1, or could be used to control the film exposure by controlling the setting of the camera diaphragm 2 as well as or instead of the shutter 4.

The foregoing description should make it clear that there has been provided in accordance with the present invention improved, novel through-the-lens automatic photographic exposure control apparatus of simple, reliable construction, which employs a photocell characterized by its ability to store light intensity information used subsequently for controlling the exposure of a photographic film after the photocell is no longer illuminated.

What is claimed is:

1. In photographic apparatus including
   a lens,
   a receiver adapted to receive a photosensitive medium,
   exposure determining means including an adjustable diaphragm means and a shutter means having open and closed positions for jointly controlling the passage of light along a path from said lens to said receiver, and
   movable means having a first position when said shutter means is closed and a second position when said shutter means is open,
   the automatic exposure control improvement comprising a light sensitive device associated with said movable means to receive light through said lens when said movable means is in said first position, and to be effectively shielded from receiving light when said movable means is in said second position, said device having an electrical resistance the value of which is dependent upon the intensity of the light to which said device is exposed for a significant time period subsequent to such exposure, and
   exposure control means including
   electrical switching means having a first condition and a second condition,
   means interconnecting said movable means and said switching means to cause said switching means to have said first condition whenever said movable means occupies said first position, and to have said second condition whenever said movable means occupies said second position,
a capacitor,
a source of voltage,
connections between said switching means, said capacitor, said source of voltage, and said device for causing said capacitor to be connected across said source of voltage and causing said device to be effectively disconnected from said capacitor whenever said switching means has said first condition, and for causing said capacitor to be effectively disconnected from said source of voltage and to be connected to said device, in a timing circuit wherein said device discharges said capacitor, whenever said switching means has said second condition, and
means connected to said capacitor and to said exposure determining means and responsive to the value of the charge on said capacitor for causing said shutter means to assume said closed position when said device has reduced the charge on said capacitor to be a predetermined value.

References Cited

UNITED STATES PATENTS

| | | | |
|---|---|---|---|
| 3,109,356 | 11/1963 | Swarofsky et al. | 95—42 XR |
| 3,205,795 | 9/1965 | Grey | 95—10 |
| 3,264,964 | 8/1966 | Ebertz | 95—10 XR |
| 3,303,766 | 2/1967 | Karikawa et al. | 95—10 |
| 3,324,779 | 6/1967 | Nobusawa et al. | 95—42 |
| 3,336,850 | 8/1967 | Otani et al. | 95—10 |

OTHER REFERENCES

Weisman, Paul, et al.: Solid-State Photocell. In Electronics (Engineering edition), vol. 31, No. 25, June 20, 1958, pp. 62–63.

NORTON ANSHER, *Primary Examiner.*

J. F. PETERS, *Assistant Examiner.*

U.S. Cl. X.R.

95—42, 53; 250—211